United States Patent
Hopfe et al.

(10) Patent No.: US 8,191,705 B2
(45) Date of Patent: Jun. 5, 2012

(54) CONVEYOR BELT FOR TRANSPORTING HOT MATERIAL

(75) Inventors: Jürgen Hopfe, Rudolstadt (DE); Petra Spier, Bad Blankenburg (DE)

(73) Assignee: Phoenix Conveyor Belt Systems GmbH, Bad Blankenburg (DE)

( * ) Notice: Subject to any disclaimer, the term of this patent is extended or adjusted under 35 U.S.C. 154(b) by 0 days.

(21) Appl. No.: 13/051,634

(22) Filed: Mar. 18, 2011

(65) Prior Publication Data

US 2011/0220467 A1    Sep. 15, 2011

Related U.S. Application Data

(63) Continuation of application No. PCT/EP2009/061311, filed on Sep. 2, 2009.

(30) Foreign Application Priority Data

Sep. 20, 2008    (DE) .......................... 10 2008 048 175

(51) Int. Cl.
    *B65G 15/34*    (2006.01)
    *B65G 15/38*    (2006.01)

(52) U.S. Cl. ..................................................... 198/847
(58) Field of Classification Search ................... 198/847
    See application file for complete search history.

(56) References Cited

U.S. PATENT DOCUMENTS

| 5,507,899 A * | 4/1996 | Watanabe et al. ............. 156/154 |
| 6,736,714 B2 * | 5/2004 | Dudovicz ...................... 451/536 |
| 2007/0251595 A1 | 11/2007 | Chen |

FOREIGN PATENT DOCUMENTS

| GB | 1042301 A | 9/1966 |
| GB | 1 338 798 A | 11/1973 |

OTHER PUBLICATIONS

International Search Report dated Jan. 22, 2010 of international application PCT/EP 2009/061311 on which this application is based.

* cited by examiner

*Primary Examiner* — Mark A Deuble
(74) *Attorney, Agent, or Firm* — Walter Ottesen

(57) ABSTRACT

A conveyor belt has a reinforcement insert and is provided to transport hot materials at higher temperatures. The core of the conveyor belt is protected against the high temperatures by an additional textile layer made of basalt fibers arranged above the reinforcement insert in the rubber cover layer defining the load-carrying side of the conveyor belt.

2 Claims, 1 Drawing Sheet

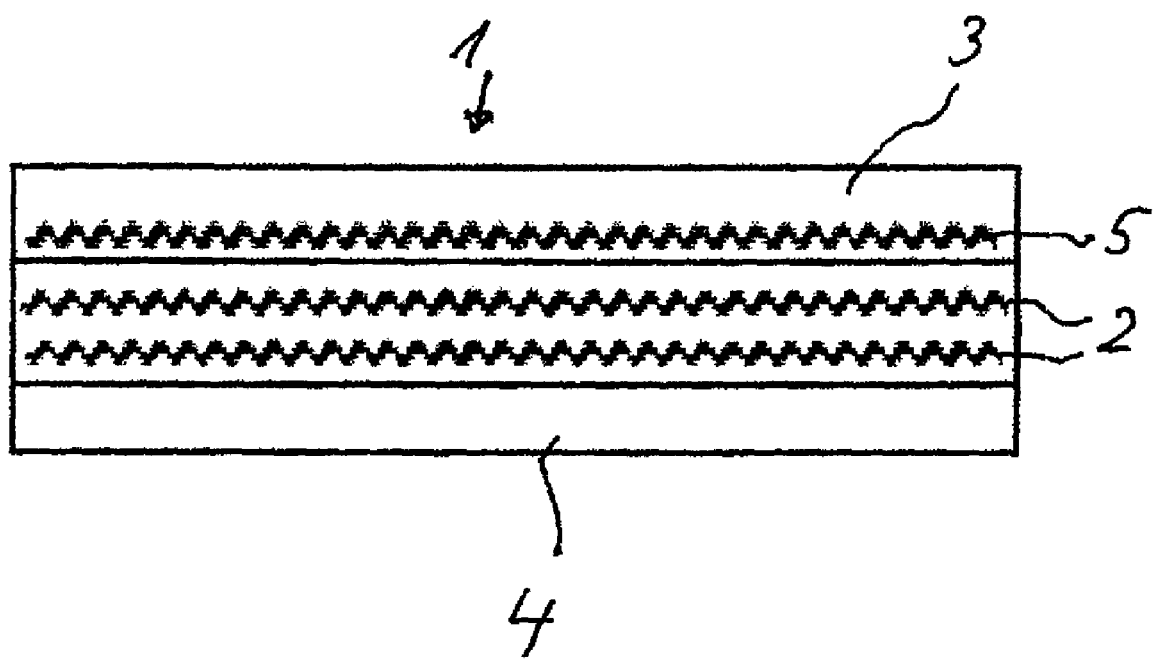

CONVEYOR BELT FOR TRANSPORTING HOT MATERIAL

CROSS REFERENCE TO RELATED APPLICATIONS

This application is a continuation application of international patent application PCT/EP 2009/061311, filed Sep. 2, 2009, designating the United States and claiming priority from German application 10 2008 048 175.0, filed Sep. 20, 2008, and the entire content of both applications is incorporated herein by reference.

FIELD OF THE INVENTION

The invention relates to a conveyor belt with textile inserts for transporting hot material.

BACKGROUND OF THE INVENTION

It is known that conveyor belts made of elastomeric material with textile inserts as reinforcement materials can be used for transporting materials at high temperatures, for example, cement clinkers, which can have a temperature of 500° C. when they require to be transported. A preferred elastomeric material used at least for the loadbearing-side outer layer of the conveyor belt is a rubber mixture with high content of an EPM rubber. The EPM rubber has good heat-resistance properties. However, a conveyor belt with textile reinforcement material can only be used within a temperature range extending up to about 250° C., since otherwise the textile inserts composed of organic material would decompose. The EPM outer layer does not adequately protect the textile reinforcement material, which is usually composed of polyester/polyamide, from the risk of thermal oxidative destruction. The surface temperatures penetrate into the core of the conveyor belt, resulting in thermal degradation of the reinforcement material present there, which represents a carcass of the belt. The conveyor belt therefore has only very restricted operating time when transporting hot material, because the high temperatures cause the core of the conveyor belt to decompose.

GB 1 042 301 discloses that a conveyor belt can be composed of a textile insert made of glass fibers and asbestos fibers. Glass fibers and asbestos fibers have high heat resistance, and the conveyor belts therefore have a relatively long operating time when transporting hot materials, examples being products from cement factories or from the treatment of iron ore. However, reasons associated with health hazards now make it impossible to use asbestos fibers. Glass fibers have the disadvantage of poor bonding to rubber, and this, in turn, adversely affects the operating time of the conveyor belt.

SUMMARY OF THE INVENTION

An object of the invention is to provide a conveyor belt of the type described above wherein the core of the conveyor belt has a relatively long service life even when the temperatures of the materials to be conveyed are relatively high.

The invention achieves the object in that an additional textile sublayer made of basalt fibers is arranged within the rubber outer layer which is on the loadbearing side.

Basalt is a basic volcanic-lava-derived rock which is comminuted and then melted at high temperatures and spun. This yields thin basalt fibers which are processed to provide basalt yarn which, in turn, is reeled, and the yarn is then further processed to textiles.

The basalt fibers can be exposed to a high temperature range without decomposition. They have low thermal conductivity together with good heat resistance. The textile made of basalt fibers therefore functions as a themal insulating layer within the conveyor belt. The sublayers of reinforcement materials located thereunder, made of synthetic fibers, for example, polyester/polyamide, are thus protected from thermal oxidative destruction.

In an advantageous embodiment of the invention, the textile sublayer made of basalt fibers has been arranged within the lower region of the rubber outer layer which is on the loadbearing side. This increases the amount of protecting rubber above the textile sublayer.

The invention markedly increases the durability of conveyor belts subject to extreme thermal stress. The basalt fiber textile has relatively low mechanical stability, but this is compensated by interaction with the belt carcass.

BRIEF DESCRIPTION OF THE DRAWING

The invention will now be described with reference to the single FIGURE of the drawing (FIG. 1) which shows an embodiment of the conveyor belt of the invention.

DESCRIPTION OF THE PREFERRED EMBODIMENTS OF THE INVENTION

The conveyor belt 1, shown schematically in cross section, has textile reinforcement material 2 composed of two sublayers of an EP textile (polyester/polyamide), which has been given a skim coat, that is, a mechanical coating of adhesive rubber on both sides, and which forms the carcass of the belt. Rubber outer layers 3 and 4 cover the two-sided rubberized reinforcement material 2 on the loadbearing and non-loadbearing sides. The rubber outer layer 3, which is on the loadbearing side, is composed of an EPM-containing rubber mixture. Within the lower region of the outer layer 3, which is on the loadbearing side, a textile sublayer 5 made of basalt fibers is embedded. The rubber outer layer 4 on the non-loadbearing side is likewise composed of an EPM-containing rubber mixture. All of the layers and sublayers are vulcanized together to completion and form the conveyor belt.

It is understood that the foregoing description is that of the preferred embodiments of the invention and that various changes and modifications may be made thereto without departing from the spirit and scope of the invention as defined in the appended claims.

LIST OF REFERENCE NUMERALS

Part of Description

1 Conveyor belt
2 Sublayers of reinforcement material
3 Rubber outer layer on loadbearing side
4 Rubber outer layer on non-loadbearing side
5 Textile sublayer of basalt fibers

What is claimed is:

1. A conveyor belt for transporting materials at high temperature and being made of elastomeric material, the conveyor belt comprising:
 a first rubber cover layer defining a loadbearing side for said materials at high temperature;
 a second rubber cover layer disposed beneath said first rubber cover layer;
 a textile reinforcement embedded between said first and second rubber cover layers; and, a textile layer made of basalt fibers and embedded within said first rubber cover layer above said textile reinforcement.

2. The conveyor belt of claim 1, wherein:

said first rubber cover layer has a lower region; and, said textile layer is disposed in said lower region of said first rubber cover layer.

* * * * *